United States Patent Office 3,364,186
Patented Jan. 16, 1968

3,364,186
COLORED TERPOLYMERS PREPARED FROM (1) DYES, (2) MONOMERS CONTAINING CROSSLINKABLE GROUPS, AND (3) ETHYLENIC UNSATURATED MONOMERS
Hans Wilhelm, Ernst Penning, Gerd Louis, Guenter Lange, and Hans Weidinger, Ludwigshafen (Rhine), Germany, assignors to Badische Anilin- & Soda-Fabrik Aktiengesellschaft, Ludwigshafen (Rhine), Germany
No Drawing. Filed May 18, 1961, Ser. No. 110,860
Claims priority, application Germany, May 20, 1960, B 57,934
1 Claim. (Cl. 260—80.72)

This invention relates to crosslinkable and crosslinked colored copolymers of dyes bearing polymerizable groups with colorless polymerizable vinyl compounds bearing crosslinkable groups and with or without other vinyl monomers conventionally used for the production of plastics. The invention further relates to the production of these crosslinkable, soluble copolymers and also the subsequent conversion of these copolymers by means of the crosslinkable groups into the insoluble state or into the gelatinous state.

Transparent colored polymeric compositions have hitherto been obtained by dissolving a dye in the finished polymer. It is a disadvantage of this method that the dye can readily be dissolved out from such colored compositions or the dye may bleed spontaneously. Moreover, it is often difficult technically, especially in the case of non-thermoplastic polymers, to distribute the dye uniformly in the polymers.

In some cases colored polymers have therefore been prepared in which the dye is chemically combined with the macromolecule. This has been accomplished by nitrating polymers bearing aryl groups, reducing the nitro groups, diazotizing the resultant amino groups and coupling with components capable of coupling to form macromolecular dyes (U.S. patent specification No. 2,274,551). This method of preparing colored polymers is however very troublesome and, like all reactions with macromolecules, only reproducible with difficulty; moreover, it can only be used with diazotizable polymers.

It is an object of this invention to provide colored copolymers whose chemically combined dye component is statistically uniformly distributed in the macromolecule and which can be converted into the gelatinous state or into the insoluble state by means of groups capable of condensation or addition which are present in the macromolecule and effect crosslinking, either as such or by means of further, at least bifunctional compounds. Another object of the invention is to provide transparent colored, insoluble, crosslinked, very color-fast copolymers which have good chemical and mechanical resistance. Another object of the invention is to provide shaped articles, pigments and coatings from such colored crosslinked copolymers. Moreover, it is an object of this invention to convert the shaped articles to be produced from the soluble uncrosslinked and thermoplastic colored copolymers by crosslinking reactions into the insoluble crosslinked thermostable state during the molding.

The said and other objects of the invention are achieved by using copolymers from at least one dye which contains at least one polymerizable olefinic double linkage and polymerizable uncolored monomers which bear groups capable of condensation or addition, and with or without the coemployment of further uncolored monomers conventionally used for the production of plastics. These colored copolymers may then be crosslinked during molding by condensation or addition reactions either as such or by means of further at least bifunctional compounds.

We have found that colored copolymers with excellent properties are obtained by copolymerizing dyes containing polymerizable olefinic groups, copolymerizable monomers containing groups capable of condensation or addition and, if desired, further monomers conventionally used for the production of plastics, and, if desired, crosslinking by way of the groups capable of condensation or addition. Copolymers falling within the scope of our invention are therefore obtained by combination of at least two types of monomer, namely (1) copolymerizable vinyl compounds containing a chromophoric system in the molecule and (2) copolymerizable vinyl compounds that contain in the molecule reactive groups by way of which the copolymer can be crosslinked after completion of polymerization, preferably during molding. As a third type of monomer, copolymerizable vinyl compounds can be polymerized in, which contain neither chromophoric systems nor reactive groups. Such vinyl compounds are the monomers usually employed for the production of plastics. The term "vinyl" as used herein is intended to be a general designation for polymerizable carbon-carbon unsaturated bonds, so that the term vinyl refers not only to vinyl groups, but also to vinylidene and acrylic groups.

Dyes which are suitable for the purposes of the present invention include dyes of the azo, phthalocyanine, triarylmethane, phenazine, oxazine and anthraquinone series which bear a polymerizable group of the general formula:

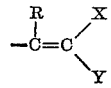

in which R denotes a hydrogen atom, halogen atom, short-chain alkyl, hydroxyalkyl, cyano, carboxy or carboxylic acid ester group, X denotes a hydrogen or halogen atom, an alkyl group, a carboxylic acid ester group or a substituted or unsubstituted aromatic radical and Y denotes a hydrogen atom, a halogen atom or an alkyl group. Of the said substances, those are preferred in which the substituent R denotes a hydrogen atom, a chlorine atom or a methylene group, the substituent X denotes a hydrogen atom or chlorine atom and the substituent Y denotes a hydrogen atom.

Examples of preferred polymerizable groups which can be contained in the dye molecule include α-methylvinyl, α-chlormethylvinyl, α-chlorvinyl, α-cyanovinyl, β-methylvinyl, β-carboxyvinyl groups which may be esterfied, α-methyl-β-carboxyvinyl groups and especially the vinyl group itself. The substituted or unsubstituted vinyl group may be attached to the chromophoric part of the dye molecule directly or for example by way of a phenylene group by a C—C linkage, usually as the result of the synthesis, or it may be introduced subsequently into the dye molecule by way of reactive groups, for example by way of a carboxyl group by esterfication with allyl alcohol, by way of an amino group, that may be substituted by a lower alkyl radical, by acylation with acrylic acid, or by way of a sulfonic acid group by pressure vinylation.

Dyes of the kind suitable for this invention are known from U.S. patent applications Nos. 10,071, filed Feb. 23, 1960, by Hans Krzikalla, Guenter Lange, Heinz Pohlemann and Guenter Krehbiel, and 10,078, filed Feb. 23, 1960, by Julius Eisele, Wilhelm Federkiel, Guenter Krehbiel, Hans Krzikalla, Guenter Lange and Heinz Pohlemann; U.S. patent specification Nos. 2,784,204 and 2,927,035, German patent specification Nos. 560,534 and 1,010,063, and French patent specification No. 1,118,705. The production of further dyes is described in the examples set forth in this specification. With a knowledge of the prior art and the teaching of the present invention, the expert will have no difficulty in synthesizing dyes suitable for this invention.

By groups which are accessible to condensation reactions we mean those which do not react under the conditions of the polymerization but which can subsequently be involved in condensation reactions either indirectly, for example by adding bifunctional or higher polyfunctional substances having crosslinking action, or directly, i.e. without adding these substances, for example by the action of heat or by change of pH.

Groups which are accessible to indirect crosslinking by condensation include carboxylic acid amide, carboxylic acid imide, ureido, aminotriazine, dicyandiamide, carbamic acid, thiocarbamic acid, glyoxalmonoureine and glyoxaldiureine groups.

These groups enter into the known condensation reactions together with suitable bifunctional or higher functional compounds, for example formaldehyde, condensates containing methylol groups, such as urea-formaldehyde, thiourea-formaldehyde, melamine-formaldehyde, guanidine-formaldehyde, dicyandiamide-formaldehyde condensates or phenol-formaldehyde condensates. Other indirectly crosslinkable radicals include carboxylic acid groups and carboxylic acid ester groups which can be condensed for example with dihydric or higher polyhydric alcohols or amines, and hydroxy groups, which are condensable for example with divalent or higher polyvalent isocyanates.

Groups which can be condensed directly, for example by the action of heat or by change of pH, include aldehyde, chlorohydrin, N-methylol and N-methylol ether groups. These groups may also be condensed indirectly.

Groups are also suitable which form crosslinkable groups with water, such as glycidyl groups or carbalkoxy groups which form hydroxy groups by hydrolysis, or acid anhydride which are converted into carboxy groups.

We give below examples of compounds which bear not only a polymerizable group but also a crosslinkable radical of the kind specified: acrylamide, methacrylamide, crotonamide, α-ethylacrylamide, α-chloracrylamide, α-phenylacrylamide, maleic acid diamide, fumaric acid diamide, itaconic acid diamide, citraconic acid diamide, N-acryloylurea, N-methacryloylurea, compounds of the general formulae:

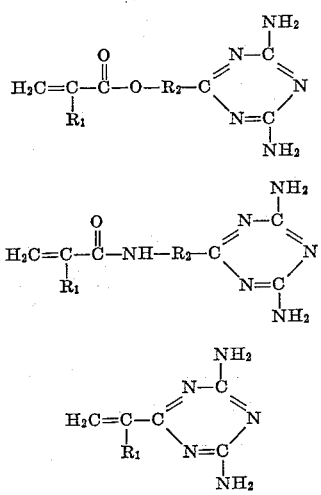

in which $R_1$ denotes a hydrogen atom or a methyl group and $R_2$ denotes a short-chain substituted or unsubstituted alkylene group, N-acryloyl-dicyandiamide, N-methacryloyl-dicyandiamide, carboxylic acid amide, carbamic acid or thiocarbamic acid derivatives, such as:

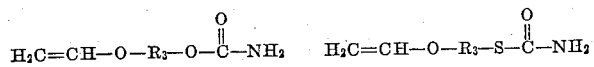

and $$CH_2=C-\overset{O}{\overset{\|}{C}}-O-R_4-O-\overset{O}{\overset{\|}{C}}-NH_2$$
$$\underset{R_1}{|}$$

in which $R_3$ denotes a short-chain alkylene or a cyclohexylene group, $R_4$ denotes a short-chain alkylene or a phenylene group, and $R_1$ has the above meaning, monoamino-bis-(allyloxy)-triazines, diaminoallyloxytriazines and glyoxal monoureine allyl ether and glyoxal diureine allyl ether.

Groups which can effect crosslinking by addition reactions include isocyanate groups and epoxy groups. These groups may be crosslinked for example with diols, diamines and dicarboxylic acids. In the case of isocyanate groups and dicarboxylic acids or water, which react with each other with the liberation of carbon dioxide, expanded colored crosslinked polymers may be obtained.

Further polymerizable compounds which bear no reactive groups may if desired be coemployed in the copolymerization, for example aromatic vinyl compounds, such as styrene and its polymerizable derivatives, polymerizable unsaturated hydrocarbons, such as butadiene and isoprene, nitriles, N-substituted amides, esters, anhydrides and salts of unsaturated polymerizable monocarboxylic or dicarboxylic acids, such as acrylic acid and its α- or β-substituted derivatives, such as methacrylic acid, crotonic acid, maleic acid, fumaric acid, itaconic acid or citraconic acid, vinyl esters of organic or inorganic acids, such as vinyl acetate, vinyl propionate or vinyl butyrate, vinyl halides, such as vinyl chloride and vinyl bromide, vinylidene halides, vinyl ethers, esters of allyl alcohols, vinylamines, such as vinylcarbazole, vinylpyridine, vinylimidazole, vinylquinoline, vinyllactams, such as vinylpyrrolidone, vinylcaprolactam or vinyl caprylic lactam. These basic compounds are also suitable as monomer compounds in the form of their quaternary salts; quaternary salts of basic vinyl ethers, acrylamide and methacrylamide substituted of the nitrogen atom by basic groups, and of esters of aminoalcohols and polymerizable carboxylic acids may also be used.

The colored copolymers may also be prepared from two or more dyes and/or two or more different monomers. The relative proportions may be varied within wide limits but we prefer to start from monomer mixtures which contain 0.1 to 20% by weight or dyes, about 0.5 to 30% of monomers effecting the crosslinking and the remainder "inert" monomers. By determining the degree of polymerization and the proportion of the monomers effecting crosslinking and by selection of suitable monomers and crosslinking components, any expert will be able to vary the mechanical properties of the finished crosslinked copolymers in the usual way.

The copolymerization of the colorless monomers bearing reactive groups with the "inert" monomers and the monomers bearing chromophoric radicals may be carried out in the usual way, for example as a bulk, solution, emulsion or suspension polymerization with the coemployment of the usual polymerization initiators and if desired in the presence of the usual further auxiliaries and additives such as emulsifiers, protective colloids, thickeners, anti-foaming agents and buffer substances.

The polymerization initiators may be those usually used for this purpose, such as peroxides, as for example hydrogen peroxide, persulfates, such as potassium persulfate, sodium persulfate or ammonium persulfate, redox systems, for example potassium persulfate-sodium formaldehyde sulfoxylate, azodi-isobutyronitrile or mixtures of these substances. In emulsion polymerizations, the usual emulsifiers and/or protective colloids, such as paraffin sulfonates, aralkyl sulfonates, adducts of ethylene oxide to fatty oils or polyvinyl acetate, are used.

The crosslinking may be carried out indirectly or directly according to the reactive groups present in the polymer. Depending on the reactivity, elevated temperatures and/or catalysts which accelerate the crosslinking may be used. For example for the reaction of amide groups with N - methylol groups, or of N - methylol groups with themselves, such catalysts are, for example, acid inorganic or organic compounds, such as ammonium nitrate, ammonium chloride, phosphoric acid and its esters, maleic acid, tartaric acid and similar substances usually employed in the condensation of methylol compounds.

The new colored emulsion polymers may serve for the production of shaped articles, especially of flat shapes such as films, nonwoven fabrics, paints, coatings and laminates. The cross-linking of the polymers is then carried out in situ, for example after application to the material to be coated or after impregnation of the material to be bonded, by the above-mentioned measures, such as heating or treatment with the substances effecting crosslinking. The crosslinking may take place at the same time as further measures, for example molding.

The shaped articles prepared with the use of the new colored copolymers are distinguished by their especially uniform color and the high fastness of the dyeings to solvents and weathering. The fastness of the dyeings is due to the fact that the dyes used are part of the copolymers and cannot be separated from the latter without complete destruction of the polymer. Moreover, the colored crosslinked polymers are usually far more lightfast than the dyes alone, an advantage which makes possible the successful use of cheap dyes of little fastness.

A special advantage of the new colored crosslinkable copolymers resides in the fact that they can as a rule be stored for any length of time in the uncrosslinked unmolded condition, used, for example molded, when required, and then during or after molding converted into the crosslinked and mechanically and chemically resistant state. The colored crosslinked copolymers may also be prepared together with other substances, such as fillers and glass fibers.

The foregoing detailed description has been given for clearness of understanding only and no unnecessary limitations are to be understood therefrom. The invention is not limited to the exact details shown and described, for obvious modifications will occur to those skilled in the art.

The invention is further illustrated by, but not limited to, the following examples. The parts and percentages given in the examples are by weight.

*Example 1*

A mixture of 200 parts of water, 50 parts of butyl acrylate, 2.75 parts of N - methylolmethacrylamide, 1.5 parts of the sodium sulfonate of the reaction product from about 25 mols of ethylene oxide and 1 mol of sperm oil alcohol and 0.2 part of potassium persulfate is heated to 80° C. within 15 minutes while stirring. Polymerization sets in after about 15 to 25 minutes. Within two hours, a stirred mixture of 171 parts of water, 213 parts of butyl acrylate, 12.1 parts of N - methylolmethacrylamide, 1.25 parts of the dye of the formula:

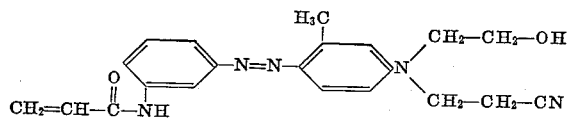

and 5 parts of the sodium sulfonate of the reaction product from about 25 mols of ethylene oxide and 1 mol of sperm oil alcohol, and separately therefrom a solution of 1 part of potassium persulfate in 40 parts of water are allowed to flow into the polymerization mixture. When the mixtures have been completely united, another 0.2 part of potassium persulfate is added and the reaction temperature kept at 80° C. for one hour. Then 14 parts of butyl acrylate are distilled off within an hour at a temperature of 90° to 95° C. while stirring. The residual yellow colored emulsion is filtered, about 18 parts of coagulate being removed. The filtrate consists of a 41.3% emulsion which upon drying at 80° C., with crosslinking, gives a transparent orange film of excellent mechanical properties.

*Example 2*

A mixture of 200 parts of water, 40 parts of butyl acrylate, 10 parts of acrylonitrile, 3 parts of N - methylolmethacrylamide, 7.5 parts of a 20% aqueous solution of the sodium sulfonate of the reaction product from about 25 mols of ethylene oxide and 1 mol of sperm oil alcohol and 0.2 part of potassium persulfate is heated to 80° C. while stirring. When polymerization sets in, an emulsion consisting of 185 parts of water, 171 parts of butyl acrylate, 42 parts of acrylonitrile, 12 parts of methylolmethacrylamide, 6 parts of the azo dye 1 - amino - 4 - acryloylaminobenzene→1 - hydroxynaphthalene - 4 - sulfonic acid, 25 parts of a 20% aqueous solution of the sodium sulfonate of the reaction product from about 25 mols of ethylene oxide and 1 mol of sperm oil alcohol and 1 part of potassium persulfate is gradually added in the course of two hours. After all has been added, the reaction is completed by heating for an hour at 80° C. A 35% dispersion of a transparent red colored polymer is obtained.

Paper is coated with the dispersion and the dispersion allowed to dry at 180° C. A transparent red coating is obtained. Wood may be provided with a transparent red coating in the same way.

*Example 3*

A dispersion is prepared as described in Example 2 but the dye therein specified is replaced by 6 parts of 1-amino-2-acetyl-4-acryloylaminoanthraquinone.

A non-woven cotton fabric is soaked with this dispersion and compacted by draining off the excess dispersion and drying. Several of these bonded fabrics are laid on one another and pressed together for half an hour at 150° C. and 200 atmospheres. A violet colored soft leatherlike material of high tensile strength is obtained.

*Example 4*

An emulsion is prepared from the following constituents: 350 parts of water, 193 parts of butyl acrylate, 64 parts of styrene, 18 parts of methylolacrylamide, 6 parts of N-methylol-acryloylurea, 15 parts of acryloylaminoazobenzene, 35 parts of a 20% aqueous solution of the sodium sulfonate of the reaction product derived from about 25 mols of ethylene oxide and 1 mol of sperm oil alcohol.

250 parts thereof are heated to 80° to 85° C. in the presence of 0.5 part of potassium persulfate. When polymerization sets in, the remainder of the emulsion is allowed to flow in in the course of two hours with powerful stirring, and at the same time a solution of 1 part of potassium persulfate in 20 parts of water is added. When all has been added, another 0.25 part of potassium persulfate is introduced and the temperature kept at 80° C. for another hour. Then the remainder of the monomers is distilled off azeotropically by heating to 90° to 95° C. and 20 parts of coagulate separated by filtration.

2.1 parts of ammonium nitrate are added to 200 parts of the resultant 35% brown-yellow dispersion and several sheets of absorbent paper are soaked with this mixture, dried and pressed together for ten minutes at 130° C. and 200 atmospheres. A yellow laminate is obtained.

*Example 5*

A mixture of 200 parts of water, 45 parts of ethyl acrylate, 5 parts of vinyl propionate, 2.1 parts of N-methylolmethacrylamide, 0.65 part of N-methylol-N-acryloylmaleic acid imide, 7.5 parts of a 20% solution of the sulfation product of an oxethylated fatty alcohol and 0.2 part of potassium persulfate is heated to 80° C. while stirring. After polymerization has set in, a mixture of 173 parts of water, 192 parts of ethyl acrylate, 21 parts of vinyl propionate, 9 parts of N-methylolmethacrylamide, 3 parts of N-methylolmaleic acid imide, 3 parts of the azo dye 1 - amino-2,5-dimethoxy-4-acryloylaminobenzene→2-hydroxynaphthalene and 25 parts of a 20% solution of the sulfation product of an oxethylated fatty alcohol together with a solution of one part of potassium persulfate in 20 parts of water are allowed to flow into the polymerization mixture in the course of two hours. After all has been added another 0.2 part of potassium persulfate is introduced and the temperature kept at 80° C. for another hour. The residual monomers are then distilled off azeotropically at 90° to 95° C. (12 parts) and the coagulate separated by filtration from the lilac colored 38.5% dispersion.

2.5 parts of ammonium chloride are added to this dispersion and a non-woven cotton fabric is soaked with the mixture. After drying, several layers of the product are pressed together for ten minutes at 140° C. and 170 atmospheres. A violet-red leatherlike material of very good tensile strength is obtained.

Example 6

A mixture of 200 parts of water, 48 parts of butyl acrylate, 2.5 parts of acrylonitrile, 5 parts of butane-diol monoacrylate, 7.5 parts of a 20% aqueous solution of the sulfation product of an oxethylated fatty alcohol and 0.2 part of potassium persulfate is heated to 80° C. while stirring. After polymerization has set in, a mixture of 173 parts of water, 198 parts of butyl acrylate, 10 parts of acrylonitrile, 22 parts of butane-diol monoacrylate, 25 parts of the above-specified emulsifier solution, 10 parts of an azo dye which has been obtained by coupling diazotized 4-nitro-2-anisidine with N-butyl-N-acryloyl-oxethyl-aniline and 1 part of potassium persulfate is dripped in within 40 minutes. After adding another 0.2 part of persulfate, the whole is heated for 80 minutes at 85° C. and the residual monomers distilled off azeotropically. A stable red dispersion is obtained which contains 35.3% of solid substance.

Several sheets of absorbent paper are soaked with this emulsion, dried for 1 hour at 100° C., and then dipped for a short time in a 25% solution in benzene of hexamethylene di-isocyanate. After the benzene has evaporated, they are pressed in several layers at 100° C. and 170 atmospheres. An elastic red laminate is obtained.

Example 7

By polymerization of 340 parts of butyl acrylate, 60 parts of methacrylamide and 19 parts of an azo dye, obtained by coupling the diazotized p-nitraniline with N-butyl-N-acryloyl-oxethylaniline, in 568 parts of water in the presence of 50 parts of the 20% emulsifier solution specified in Example 6 and 2.5 parts of potassium persulfate, a stable, dark red colored 30.8% dispersion is obtained.

A non-woven cotton fabric is soaked with a mixture of 250 parts of the said dispersion, 15 parts of dimethylolurea and 0.3 part of ammonium nitrate, dried and pressed together in several layers at 120° C. and 180 atmospheres. A dark red flexible leather-like material is obtained.

Example 8

250 parts of the dispersion of the polymer with reactive acid amide groups according to Example 7 are mixed with 30 parts of N,N'-dimethylolbutane-(1,4)-diurethane and 0.3 part of ammonium nitrate. The mixture is applied to a glass fiber fabric and, after drying, pressed in several layers at 120° C. and 170 atmospheres. A flexible transparent pressed plate is obtained.

Example 9

A 30.2% polymer dispersion is prepared from 126 parts of butyl acrylate, 35 parts of acrylonitrile, 25 parts of acrylic acid, 9 parts of the azo dye of Example 7, 32.5 parts of the 20% emulsifier solution specified in Example 6, 373 parts of water and 1.5 parts of potassium persulfate.

3.5 parts of concentrated (about 28%) ammonia are added to 100 parts of this dispersion to neutralize the reactive carboxyl groups, and then 0.22 part of dimethylaniline and 17.6 parts of a 66.5% aqueous emulsion of a reaction product containing at least two epoxy groups per molecule and derived from pentaerythritol and epichlorhydrin. A non-woven cotton fabric is soaked with this mixture, the excess of emulsion pressed off, dried and pressed in several layers at 110° C. and 170 atmospheres. A flexible dark red laminate is obtained.

Example 10

A 48.3% stable dispersion is prepared from 450 parts of butyl acrylate, 25 parts of N-methylol-methacrylamide, 25 parts of the water-soluble dye obtained by coupling diazotized N-methacryloyl-m-phenylene diamine with 1-(2-chlor-5-sulfo)-phenyl-3-methyl-pyrazolone-(5), 50 parts of the 20% emulsifier solution specified in Example 6, 2.5 parts of potassium persulfate and 450 parts of water.

28 parts of this dispersion are mixed with 0.4 part of the copolymer derived from 50 parts of methacrylamide, 8.5 parts of a mixture of 50 parts of N,N'-dimethylolurea monomethyl ether and 50 parts of N,N'-dimethylolurea dimethyl ether, 0.3 part of diammonium phosphate, 0.3 part of ammonium nitrate, 20 parts of water and 15 parts of sawdust. After drying the composition is pressed at 120° C. and 150 atmospheres in a mold to a yellow colored elastic laminate.

Example 11

A 40% colored polymer dispersion is prepared from 225 parts of butyl acrylate, 30 parts of ethyl acrylate, 15 parts of methyl methacrylate, 15 parts of methacrylmide, 15 parts of the azo dye obtained by coupling diazotized 2,4-dichloraniline with N-(β-vinyloxy)-ethyl-N-ethylaniline, 50 parts of the 20% emulsifier solution specified in Example 6, 3 parts of potassium persulfate and 400 parts of water.

Absorbent paper is soaked with a mixture of 150 parts of the resultant yellow dispersion, 20 parts of a 1:1 mixture of N,N'-dimethylolurea monomethyl ether and N,N'-dimethylolurea dimethyl ether, 0.7 part of ammonium nitrate and 20 parts of water. After drying, several layers are pressed together at 130° C. and 150 atmospheres. A yellow elastic material is obtained.

Example 12

A 49.4% yellow dispersion is prepared by polymerization of 45 parts of butyl acrylate, 25 parts of N-methylolmethacrylamide, 1.25 parts of a triazine of the structure:

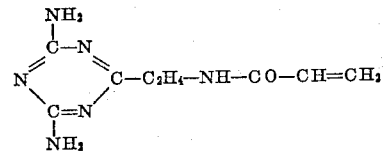

25 parts of a water-soluble azo dye obtained by coupling diazotized N-acrylol-p-phenylene diamine with 1-(2-chlor-5-sulfo)-phenyl-3-methylpyrazolone-(5), 50 parts of the 20% emulsifier solution specified in Example 6, 2.5 parts of potassium persulfate, 2.5 parts of sodium pyrophosphate and 450 parts of water.

A non-woven cotton fabric is soaked with a mixture of 50 parts of the resultant yellow emulsion, 8 parts of N,N'-dimethylol-butane-(1,4)-diurethane and 0.5 part of ammonium nitrate and the excess emulsion removed. After drying, several layers of the fabric are pressed together at 130° C. and 170 atmospheres. A flexible laminate of high tensile strength is obtained.

Example 13

400 parts of water, 74 parts of butyl acrylate, 6 parts of acrylamide, 27 parts of a 15% aqueous soap solution whose active constituents are the sodium salts of hydroxyoctadecane sulfonic acid and octadecane sulfonic acid (mixing ratio 1:1), 1 part of potassium persulfate and 1 part of sodium pyrophosphate are placed in a 3-l. stirring autoclave. After rinsing several times with nitrogen, 114 parts of vinyl chloride are forced in. When the autoclave has an internal temperature of 80° to 85° C., two feeds are supplied simultaneously within 2 hours. The first feed consists of 296 parts of butyl acrylate and the other of a solution of 24 parts of acrylamide, 4 parts of potassium persulfate, 4 parts of sodium pyrophosphate, 30 parts of the water-soluble azo dye from Example 12 and 106 parts of the said 15% soap solution in 467 parts of water. At the same time, 340 parts of vinyl chloride are forced in in four equal portions. After all has been added, the reaction mixture is heated to 90° to 95° C. for another ten hours while stirring. Then 20 parts of residual monomer (butyl acrylate) are removed from the resultant yellow dispersion by heating to 90° C. and leading a powerful current of nitrogen over the same, as well as 1 part of coagulate by filtration.

A mixture of 35 parts of the 38.8% dispersion, 5 parts of N,N'-dimethylolurea and 0.5 part of ammonium nitrate is applied to a metal plate or paper and the film allowed to dry at room temperature. Then crosslinking is effected by heating for 30 minutes at 130° C. A firmly adherent, elastic, transparent yellow coating is obtained.

*Example 14*

A copolymer from 75 parts of butyl acrylate, 10 parts of acrylamide, 15 parts of methyl methacrylate, 20 parts of butane diol monoacrylate and 6 parts of the coupling product of diazotized 2,4-dichloraniline and N-ethyl-N,β-vinyloxyethylaniline in 180 parts of ethanol, prepared with 1.5 parts of azodi-isobutyronitrile at 80° C., is diluted with 300 to 450 parts of ethanol and 10 parts of hexamethylene di-isocyanate are added. Several nonwoven fabrics of cellulose fibers are impregnated with this mixture, dried at 35° to 40° C. and several layers pressed together at 150° C and 200 atmospheres for 15 to 20 minutes. A yellow colored soft leatherlike material of high tensile strength is obtained.

*Example 15*

10 parts of methyl methacrylate, 54.5 parts of butyl acrylate, 35.5 parts of acrolein and 5 parts of a dye formed by coupling diazotized 2,4-dichloraniline with N,β-acryloyl-oxethyl-N-ethyl-aniline are polymerized in 50 parts of toluene and 50 parts of ethanol at 60° to 100° C. with the aid of 1.5 parts of azodi-isobutyronitrile. 30 parts of bisacetoacetic acid glycol ester and 0.1 part of phosphoric acid are added to the viscous solution and the whole is diluted with 300 to 400 parts of ethanol. 1 part of piperidine is added to the liquor obtained and the mixture is brushed or sprayed onto bleached wood. After drying at 80° to 90° C. for 24 hours, a red-yellow coating fast to washing and solvents is obtained.

It is of course more convenient to add the piperidine to the liquor after it has been applied, for example by spraying it on. Any liquor which is not used is then not rendered unusable by coagulation.

*Example 16*

A solution of 52 parts of butyl acrylate, 12 parts of methacrylamide, 4 parts of N-methylolmethacrylamide, 10 parts of vinyl propionate and 2 parts of 1-amino - 4 - acryloloamino-anthraquinone-2-carboxylic acid isobutyl ester in a mixture of 100 parts of butanol and 20 parts of toluene is heated at 80° to 85° C. under a nitrogen atmosphere for 8 hours in the presence of 0.2 part of tertiary butyl perbenzoate and 0.6 part of azodi-isobutyronitrile. A 38.2% blue-violet polymer solution is formed.

0.5 part of 85% phosphoric acid is added thereto, the whole diluted with the butanol-toluene mixture to a solids content of about 20% and used for soaking several sheets of absorbent paper. By pressing the sheets together for 15 minutes at 140° C. and 200 atmospheres after drying, a durably colored laminate is obtained.

*Example 17*

The polymer solution of Example 3 to which phosphoric acid has been added is mixed with a solution of 15 parts of the tetrabutyl ether of tetramethylolacetylene diurea in 250 parts of isopropanol. Wood pulp is soaked with the mixture and predried at 40° to 50° C. A durably blue-violet colored laminate is obtained from this composition by pressing at 150° C. and 200 atmospheres.

*Example 18*

270 parts of methyl methacrylate, 13.5 parts of butanediol monoacrylate, 0.75 part of the coupling product of diazotized N-acryloylamino-p-phenylenediamine, and N-(3'-hydroxy)naphthoyl-(2')-2,4-dimethoxy - 5-chloroaniline, 9 parts of di-n-butyl phthalate and 2.25 parts of benzoyl peroxide are heated to 75–80° C. in a nitrogen atmosphere while stirring. When the composition has assumed a syrupy consistency, polymerization is discontinued by cooling to 20° C.

The composition thus obtained is mixed with 8 parts of hexamethylene di-isocyanate, degassed at reduced pressure and cast in a mold which consists of 2 parallel glass plates which are sealed at the sides and are only slightly spaced apart.

The mold filled with polymer is heated in a waterbath at 80° C. for two to three hours and then kept in a drying cabinet for 24 hours at 80° C. and for 12 hours at 100° C. A transparent red colored plate is obtained.

*Example 19*

2 parts of a copper phthalocyanine dye with four sulfonic acid groups two of which have been reacted with N-acryloyl-p-phenylene diamine, are dissolved in 18 parts of vinylpyrrolidone. To polymerize it, this solution is heated for 14 hours at 78° C. together with 5 parts of N-methylol-methacrylamide, 15 parts of methyl methacrylate and 60 parts of butyl acrylate in 123 parts of toluene and 110 parts of ethanol using 1.0 parts of azodi-isobutyronitrile. A 25% solution of a greenish-blue copolymer is obtained.

A mixture of 10 parts of this solution, 0.1 part of the tetrabutyl ether of tetramethylolacetylenediurea and 0.1 part of glacial acetic acid is brushed onto wood or paper and dried for 20 minutes at 140° C. A transparent blue coating is obtained.

*Example 20*

A solution of 70 parts of acrylamide, 20 parts of ethyl acrylate, 5 parts of N-methylol-methacrylamide, 5 parts of the azo dye of Example 2 and 1 part of benzoyl peroxide in 900 parts of butanol is heated at 50° C. for 8 hours while stirring. A yellow precipitation polymer with the K-value 35 is obtained which is dried in vacuo at 45° C. and then extracted with ethyl acetate to remove small amounts of monomer. Absorbent paper is soaked with a solution of 10 parts of the said water-soluble precipitation polymer, 1.0 part of tetramethylolacetylenediurea and 0.5 part of ammonium nitrate in 88 parts of water. After drying, several layers of the said paper are pressed together at 150° C. and 200 atmospheres. A hard yellow laminate is obtained.

As is apparent from the specification and examples the gist of the present invention lies in colored crosslinkable copolymers containing in the molecule, in combined form, copolymerizable compounds which are not dyes and copolymerizable compounds which are dyes and contain in the molecule groups by which the polymer molecules that contain the copolymerizable compound and the copolymerizable dye are rendered capable of entering into cross-linking reactions. Another feature of this invention lies in copolymers of the said kind, in which the molecules are cross-linked either directly by way of their crosslinkable groups or indirectly by means of auxiliary compounds effecting crosslinking. "Copolymerizable compounds contained in combined form" are constituents that make up the macromolecule during copolymerization. A further feature of the invention is mixture of copolymers of the said kind with other copolymers of the said kind and/or known polymers or copolymers.

We claim:
1. Colored crosslinkable copolymers which have been obtained by addition copolymerization of
   (a) 0.1 to 20% by weight of an azo, anthraquinone or phthalocyanine dye containing at least one member selected from the class consisting of acryloyl group and methacryloyl group as a copolymerizable group,
   (b) at least 0.5% by weight of a monomer containing one olefinically unsaturated copolymerizable group and at least one group which is capable of producing a crosslinked polymer and which is selected from the class consisting of N-methylol, N-methylol ether and chlorhydrin groups, and
   (c) from 50 to 99.4% by weight of monomers selected from the group consisting of vinyl halides, styrene, unsaturated hydrocarbons of 2 to 5 carbon atoms, vinyl alkyl esters, acrylic acid alkyl esters, methacrylic acid alkyl esters, acrylonitrile, methacrylonitrile, vinyl alkyl ethers, alkyl esters of allyl alcohol and N-vinyllactams of 5 to 7 ring members.

References Cited

UNITED STATES PATENTS

| | | | |
|---|---|---|---|
| 2,513,098 | 6/1950 | Kropa | 260—314.5 |
| 1,500,844 | 7/1924 | Plauson. | |
| 2,875,047 | 2/1959 | Oster | 96—115 |
| 2,940,956 | 6/1960 | Smith | 260—88.1 |
| 3,073,699 | 1/1963 | Firestine | 260—80 |
| 2,397,454 | 3/1946 | Woodward. | |
| 3,157,623 | 11/1964 | Braun | 260—80 |
| 2,760,863 | 8/1956 | Plambeck | 96—35.1 |
| 2,927,035 | 3/1960 | Wegmann | 106—165 |
| 3,037,963 | 6/1962 | Christenson | 260—72 |
| 3,079,434 | 2/1963 | Christenson et al. | 260—561 |
| 3,247,139 | 4/1966 | Christenson et al. | 260—21 |
| 3,251,743 | 5/1966 | Hahn et al. | 167—88 |

FOREIGN PATENTS

| | | |
|---|---|---|
| 1,083,047 | 6/1960 | Germany. |
| 830,876 | 3/1960 | Great Britain. |
| 858,183 | 1/1961 | Great Britain. |

OTHER REFERENCES

The India-Rubber Journal, Issue of Apr. 20, 1946, pp. 501, 502, and 505.

The India-Rubber Journal, Issue of Apr. 27, 1946, pp. 533–534, and 537.

DONALD E. CZAJA, *Primary Examiner.*

LEON J. BERCOVITZ, N. H. BURSTEIN, *Examiners.*

F. McKELVEY, M. I. MARQUIS, M. C. JACOBS,
*Assistant Examiners.*